(12) United States Patent
Schaarschmidt

(10) Patent No.: US 8,471,681 B2
(45) Date of Patent: Jun. 25, 2013

(54) TRANSPORT AND STORAGE UNIT HAVING AN IDENTIFICATION UNIT AND A READING UNIT

(76) Inventor: Erich Schaarschmidt, Niederviehbach (DE)

( * ) Notice: Subject to any disclaimer, the term of this patent is extended or adjusted under 35 U.S.C. 154(b) by 226 days.

(21) Appl. No.: 12/676,931

(22) PCT Filed: Sep. 5, 2008

(86) PCT No.: PCT/EP2008/007283
§ 371 (c)(1),
(2), (4) Date: Mar. 12, 2010

(87) PCT Pub. No.: WO2009/033613
PCT Pub. Date: Mar. 19, 2009

(65) Prior Publication Data
US 2010/0194540 A1 Aug. 5, 2010

(30) Foreign Application Priority Data

Sep. 7, 2007 (DE) .......................... 10 2007 044 560

(51) Int. Cl.
*H04Q 5/22* (2006.01)
*G08B 13/14* (2006.01)

(52) U.S. Cl.
USPC ... 340/10.1; 340/10.2; 340/10.31; 340/572.1; 340/572.4

(58) Field of Classification Search
USPC ............ 340/10.1, 572.1, 572.4, 572.7, 572.8, 340/5.61, 10.3, 10.43; 343/700
See application file for complete search history.

(56) References Cited

U.S. PATENT DOCUMENTS

| 5,883,376 | A * | 3/1999 | Rosch et al. | 235/492 |
| 7,271,726 | B2 * | 9/2007 | Hollon | 340/572.7 |
| 7,528,726 | B2 * | 5/2009 | Lee et al. | 340/572.7 |
| 7,535,366 | B2 * | 5/2009 | Egbert et al. | 340/572.7 |
| 2003/0117268 | A1 * | 6/2003 | Hewitt et al. | 340/5.92 |
| 2005/0012619 | A1 * | 1/2005 | Sato | 340/572.8 |
| 2006/0132312 | A1 * | 6/2006 | Tavormina | 340/572.7 |
| 2009/0273448 | A1 * | 11/2009 | Tuttle | 340/10.3 |

FOREIGN PATENT DOCUMENTS

| DE | 43 13 049 C2 | 10/1994 |
| DE | 29 504 712 U1 | 7/1996 |
| DE | 195 20 131 C1 | 10/1996 |
| DE | 298 21 877 U1 | 4/1999 |
| DE | 199 03 240 A1 | 8/2000 |
| DE | 200 19 020 U1 | 3/2002 |
| DE | 202 14 099 U1 | 1/2003 |
| DE | 102005031579 A1 | 1/2007 |
| GB | 2048816 A * | 12/1980 |
| GB | 2 360 422 A | 9/2001 |
| GB | 2360422 A * | 9/2001 |
| WO | 2007003293 A1 | 1/2007 |

* cited by examiner

*Primary Examiner* — Daniel Wu
*Assistant Examiner* — Mancil Littlejohn
(74) *Attorney, Agent, or Firm* — Laurence A. Greenberg; Werner H. Stemer; Ralph E. Locher

(57) ABSTRACT

A transportation and storage unit includes a transponder identification unit for distinguishing and identifying goods or other objects, a multiplicity of which may be disposed, transported and/or stored and/or handled on palettes or similar transport aids in so-called groups, bunches, units or bundles. A plurality of mutually-separated transponders are embedded in the transponder identification unit. The transponder identification unit surrounds the periphery of the transportation and storage unit. A reading unit for sensing a multiplicity of transportation and storage units is also provided.

11 Claims, 6 Drawing Sheets

TRANSPORT AND STORAGE UNIT HAVING AN IDENTIFICATION UNIT AND A READING UNIT

BACKGROUND OF THE INVENTION

Field of the Invention:

The invention relates to a transportation and storage unit having an identification unit for distinguishing and identifying goods or other articles which can be arranged, transported and/or stored and/or handled in a large number on pallets or similar transportation aids in what are known as packs or trading units. In this case, the transportation or storage unit preferably comprises a steel or predominantly metal container, particularly a barrel with a metal base body. Alternatively, the transportation or storage unit may comprise a nonmetallic material such as glass, cardboard or plastic. The invention also relates to a reading unit for sensing and identifying a plurality of transportation and storage units which are arranged in a pack on a means of transport, particularly an HGV, and are equipped in such a manner.

It is already known practice to use what are known as transponders in the field of logistics for the purpose of distinguishing and identifying goods. Said transponders are communication units which are capable of communicating with a reading device. In this case, the communication is wireless and is performed by means of radio-frequency or radio signals. For identification purposes, this involves the use, in particular, of what are known as RFID transponders and RFID reading units communicating therewith. Transponders may have a high storage capacity in what is known as a long-range design and a reading range of several meters.

The prior art discloses a multiplicity of solutions which are concerned with the arrangement of such transponders on the widest variety of transportation units. DE 298 21 877 U1 discloses an industrial barrel-like thin-walled packaging container which, for the purpose of holding a sensitive bar-like transponder, has a particular mount or separate protective apparatus which is mounted in the region of a vertically running side wall of the container on the surface of the container wall. To this end, in particular, a corresponding indentation or bulge is provided into which the transponder has been inserted by means of a mount or protective apparatus. DE 202 14 099 U1 discloses a drinks container which has a transponder for emitting radio-frequency signals (RF). In this case, the transponder is preferably bonded to the respective drinks container, molded into the base material thereof or into a portion that is (ir)reversibly connected to the container, pressed in or forced on or screwed onto the container or else simply attached to the container. DE 10 2006 026 014 A1 discloses an arrangement having a transponder and a metal element associated with the transponder. This arrangement is intended, in particular, to solve the problem of the arrangement of the transponder in or on metal elements, since metallic materials can significantly influence the operation of the transponder. This is because metallic materials can absorb at least a portion of the electromagnetic energy from the electromagnetic signals which are to be received or sent, which means that the communication between the transponder and the reading unit arranged separately therefrom is suppressed. It is also stated that to solve the problem it has already been proposed that the transponder or at least the antenna thereof be mounted such that there is a maximum interval between the metal container and the antenna. This is achieved by virtue of a very thick adhesive film. The results achieved thereby are described as unsatisfactory, however. For this reason, the teaching therein proposes using a depression in the metal element to form an antenna for the transponder. The transponder itself is mounted directly on the metal element in this case, with the transponder at least partially covering the depression in the metal container. Alternatively, the transponder may itself be at least partially arranged in the depression. The containers can usually be identified only by separating the containers, since the containers arranged thereon either do not point in the direction of the reading unit or are concealed by other metal containers, as a result of which the electromagnetic energy from the electromagnetic signals to be received or sent can likewise be absorbed. The same problem arises when containers made of glass or plastics are used to transport liquids, since the liquids likewise absorb the radiation.

The teaching known from the prior art allows the transportation containers, which particularly comprise steel or other metallic materials, and which are arranged in a multiplicity of packs or trading units, to be identified only inadequately or not at all. What is known as pack readability cannot be realized with the known arrangements, since the transponders are respectively arranged only at one point on the relevant containers, which, in the case of an arrangement in packs, are either concealed by other containers or else arranged in the pack such that the transponders do not point in the direction of the stationary reading unit, so that the metallic materials or else liquids stored in the containers comprising nonmetallic materials absorb at least a portion of the electromagnetic energy from the electromagnetic signals which are to be received or sent, with the communication between the transponder and the reading unit arranged separately therefrom being suppressed.

BRIEF SUMMARY OF THE INVENTION

The object of the present invention is therefore to overcome the aforementioned drawbacks of such arrangements in respect of pack readability and to provide commercial applicability of such identification systems for containers in the field of transportation and logistics. It is a further object to provide a suitable reading unit which, in particular, allows pack readability for transportation and storage units with an identification unit which are arranged on an HGV. The invention achieves this object by means of the features of claims 1 and 12. Advantageous embodiments of the invention are contained in the respective associated claims.

Accordingly, the invention comprises a transportation and storage unit having a transponder identification unit for distinguishing and identifying goods or other articles which can be arranged, transported and/or stored and/or handled in a large number on pallets or similar transportation aids in what are known as packs or trading units, wherein a plurality of transponders at intervals from one another are embedded in the transponder identification unit, and the transponder identification unit encompasses the perimeter of the transportation and storage unit.

Advantageously, in this case, at least four, but preferably five to six, transponders are embedded in the transponder identification unit at intervals from one another, wherein the transponders each have the same identification data. In one preferred embodiment of the invention, the transponder identification unit encompasses the transportation and storage unit in annular fashion and almost horizontally. According to a further embodiment, the transponder identification unit may be arranged centrally with respect to the transportation and storage unit.

According to a further embodiment of the invention, the transportation and storage unit preferably has two rolling and/or centering rings, wherein the transponder identification unit is arranged as a third ring between the rolling and centering rings.

However, it is alternatively also possible to provide for the transportation and storage unit to have two rolling and centering rings, wherein at least one of the rolling and centering rings itself is in the form of a transponder identification unit.

Advantageously, the transponders can be protected from external mechanical influences by the transponder identification unit and can be placed at intervals from the base body of the transportation and storage unit.

When a multiplicity of transportation and storage units are arranged on a pallet or similar transportation aids, they are advantageously held mechanically at intervals by the transponder identification units. This advantageously produces a kind of "radio gap", which means that the signals from adjacent units or units positioned further behind can also reach the reading unit.

The arrangement according to the invention allows for the first time a pack reading capability using RFID technology, particularly for transportation units comprising steel or other metallic materials and/or in combination with other materials. In particular, the invention realizes the simultaneous reading or identification of transportation units arranged on a pallet without their needing to be separated. In this case, the identification unit contains the transponders positioned at a defined interval, which are thus able to develop an optimum effect. The transportation and storage units may have any desired geometric shape in this case. A particular advantage is also the simple and rapid attachment of the transponder identification unit to the transportation and storage units and also the ease of retrofitting.

To ensure the radio range which is required for pack reading, the UHF band is currently regarded as preferred. Other frequency bands are therefore not excluded.

According to a further embodiment of the invention, the transponders are in the form of active transponders, which means that the radio range can be improved further.

In contrast to passive transponders (no inherent power), active systems have a power supply (e.g. in the form of a battery). This means that active transponders not only allow longer communication ranges but also make it possible to manage relatively large data stores that operate integrated sensor systems.

The scope of the invention also covers a reading unit for sensing a multiplicity of transportation and storage units which are arranged on a means of transport, particularly an HGV, and preferably on boards, wherein the transportation and storage units may be designed as illustrated above. However, it is not imperatively stipulated that the transportation and storage units are designed in accordance with the features described above. Advantageously, the reading unit is in the form of a spiry portal which can be used to cover the height of the means of transport. The portal is of mobile design, i.e. preferably provided with wheels, and has at least one RFID reading and reception unit. The portal is either provided with its own power supply or can be supplied with the necessary power externally by cable. To cover the total height of the widest variety of means of transport, the portal is advantageously designed so as to be vertically adjustable. Advantageously, the RFID reading and reception units are also arranged so as to be vertically adjustable. This can be done manually or else electrically. According to a further feature of the invention, provision is made for the portal to have a screen for showing the reading results and a reader control unit. The screen provided in line with the invention is intended to provide an overview of the reading results directly in situ.

BRIEF DESCRIPTION OF THE SEVERAL VIEWS OF THE DRAWING

The invention will be explained in more detail below using exemplary embodiments which are shown in the drawings, in which.

DESCRIPTION OF THE INVENTION

Figure 1:
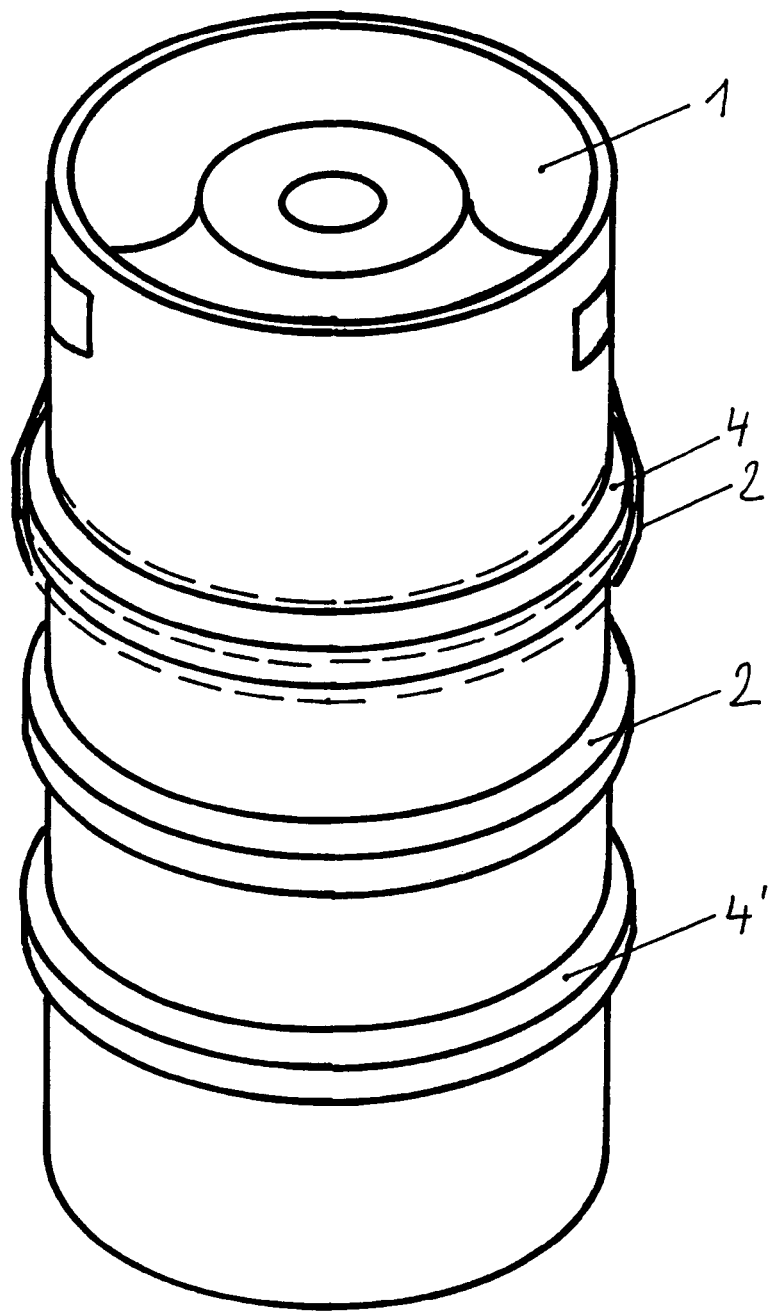
FIG. 1 shows a transportation and storage unit in the form of a polyurethane-coated barrel.

FIG. 1 shows a polyurethane-coated barrel (PU barrel) as a transportation and storage unit 1. The PU barrel has two rolling and/or centering rings (4, 4'), wherein the transponder identification unit (2) is arranged as a third ring between the rolling and centering rings (4, 4'). In this case, the transponder identification unit (2) is in the form of a support for the RFID transponders (3). Alternatively (dashed illustration), it is also possible in the case of PU barrels for one of the rolling and centering rings (4, 4') to be in the form of a transponder identification unit (2). In this case, one of the rolling and centering rings (4) is used as a base support, said ring having a thin coat applied which forms the transponder identification unit (2).

To ensure the radio range which is required for pack reading, the UHF band is currently regarded as preferred. Other frequency bands are therefore not excluded.

Figure 2:
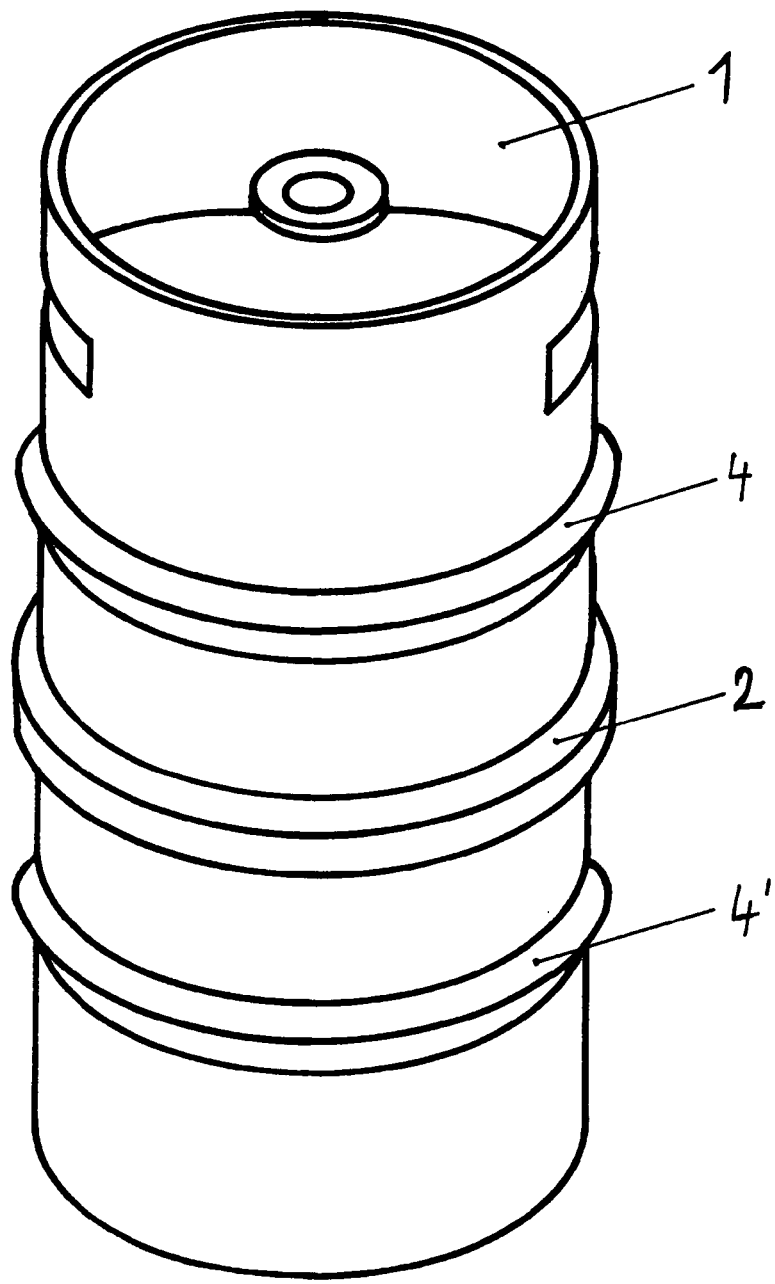
FIG. 2 shows a transportation and storage unit in the form of a steel barrel.

FIG. 2 shows a steel barrel with a transponder identification unit (2) which encompasses the barrel 1 in annular fashion.

Figure 3:
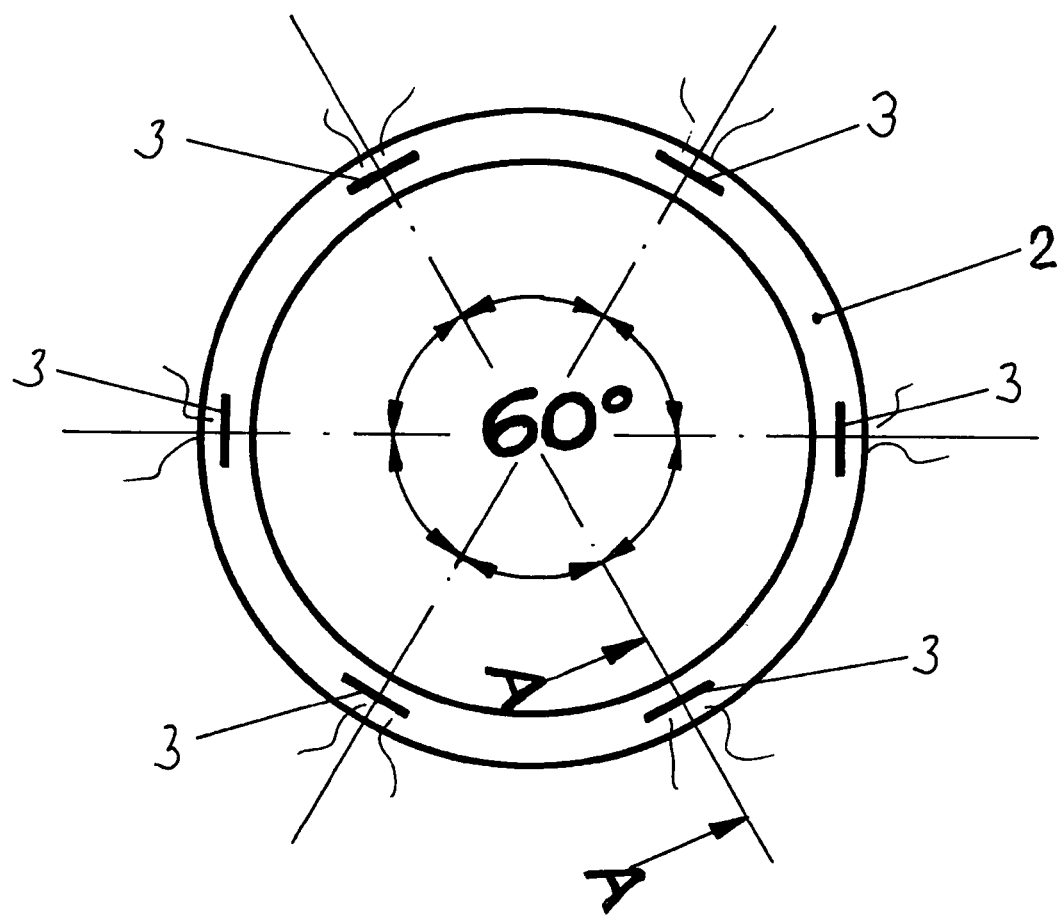
FIG. 3 shows a transponder identification unit.

FIG. 3 shows a plan view of the design of a transponder identification unit 2. The transponder identification unit 2 is of annular design and preferably comprises plastic or rubber. Embedded in the transponder identification unit are six RFID transponders 3 which are at intervals from one another at an angle of 60°. It is naturally also possible for the transportation and storage unit 1 to be in the form of a canister or similar cuboid container, for example, in which case the transponder identification unit 2 may also be arranged vertically.

Figure 4:
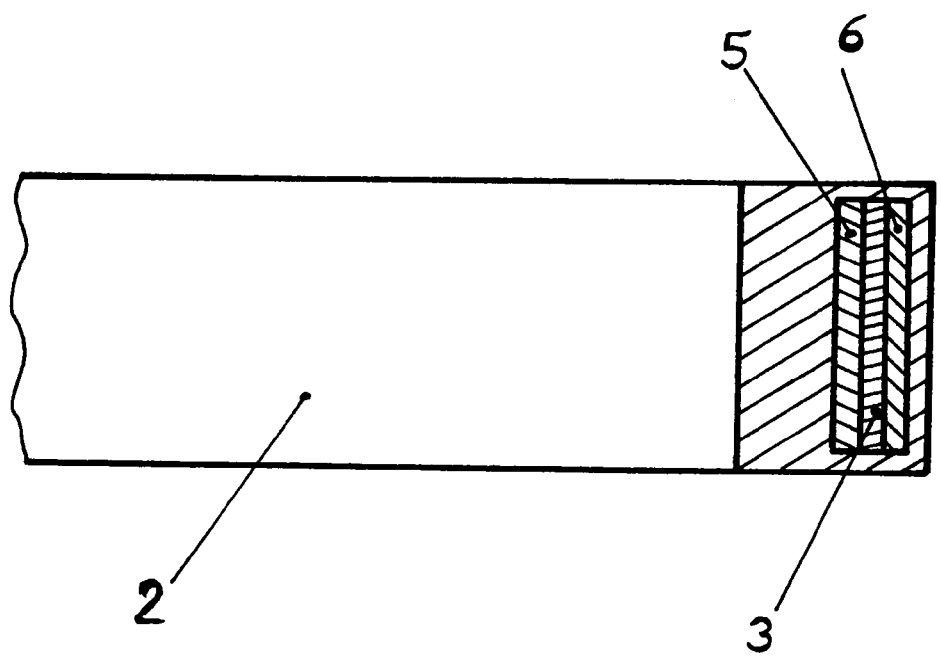
FIG. 4 shows a sectional illustration A-A through a transponder identification unit as shown in FIG. 3.

FIG. 4 shows a section A-A through the transponder identification unit 2 shown in FIG. 3. In this case, the RFID transponders 3 are embedded in the transponder identification unit 2. The RFID transponders 3 can be protected from external mechanical influences (drops, impacts) by a protective plate 6. Furthermore, the RFID transponders 3 may be provided with a shielding foil 5 on the side close to the container. This can sometimes optimize the reading range.

Figure 5:
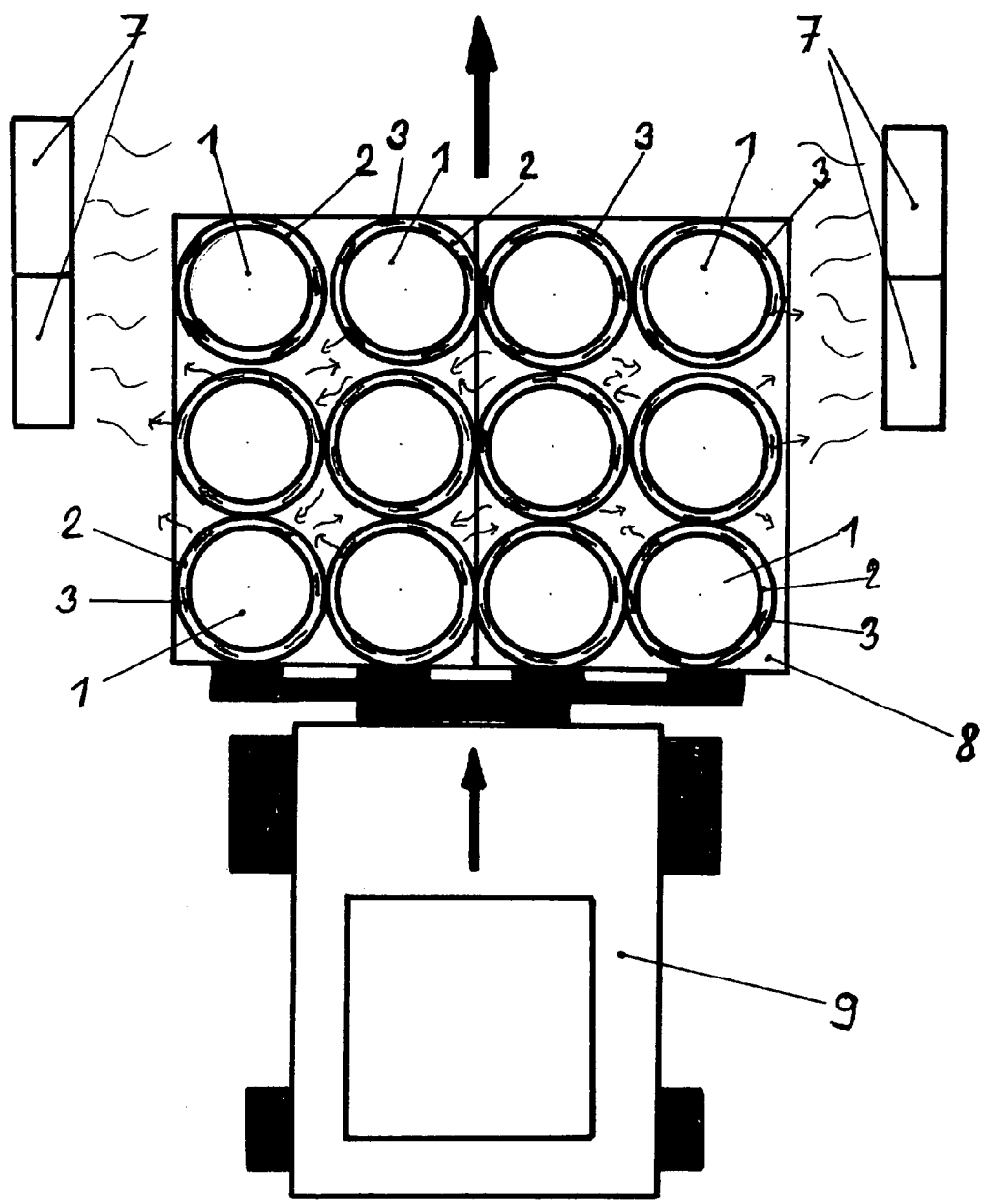
FIG. 5 shows a plan view of a reading unit with a multiplicity of transportation and storage units arranged on a double pallet.

FIG. 5 shows a plan view of a reading unit 7 with a multiplicity of transportation and storage units 1, in the form of barrels, which are arranged on a double pallet 8 and with a stacking or conveying device 9. In this case, the reading unit 7 is provided on both sides of the pallet 8. The barrels 1 are arranged in a plurality of layers on the pallet 8. Each barrel 1 is provided with a transponder identification unit 2. In this case, the transponder identification unit 2 has six transponders 3 distributed over the periphery of the barrel, each transponder 3 having the same identification data. In the drawing, not all the barrels are provided with reference symbols. However, each barrel has a transponder identification unit 2 with transponders 3 distributed over the periphery of the barrel. The transponder identification units 2 place the barrels 1 arranged on the pallet 8 at intervals from one another such that the resultant "radio gaps" mean that the signals can actually reach all the barrels.

Figure 6:
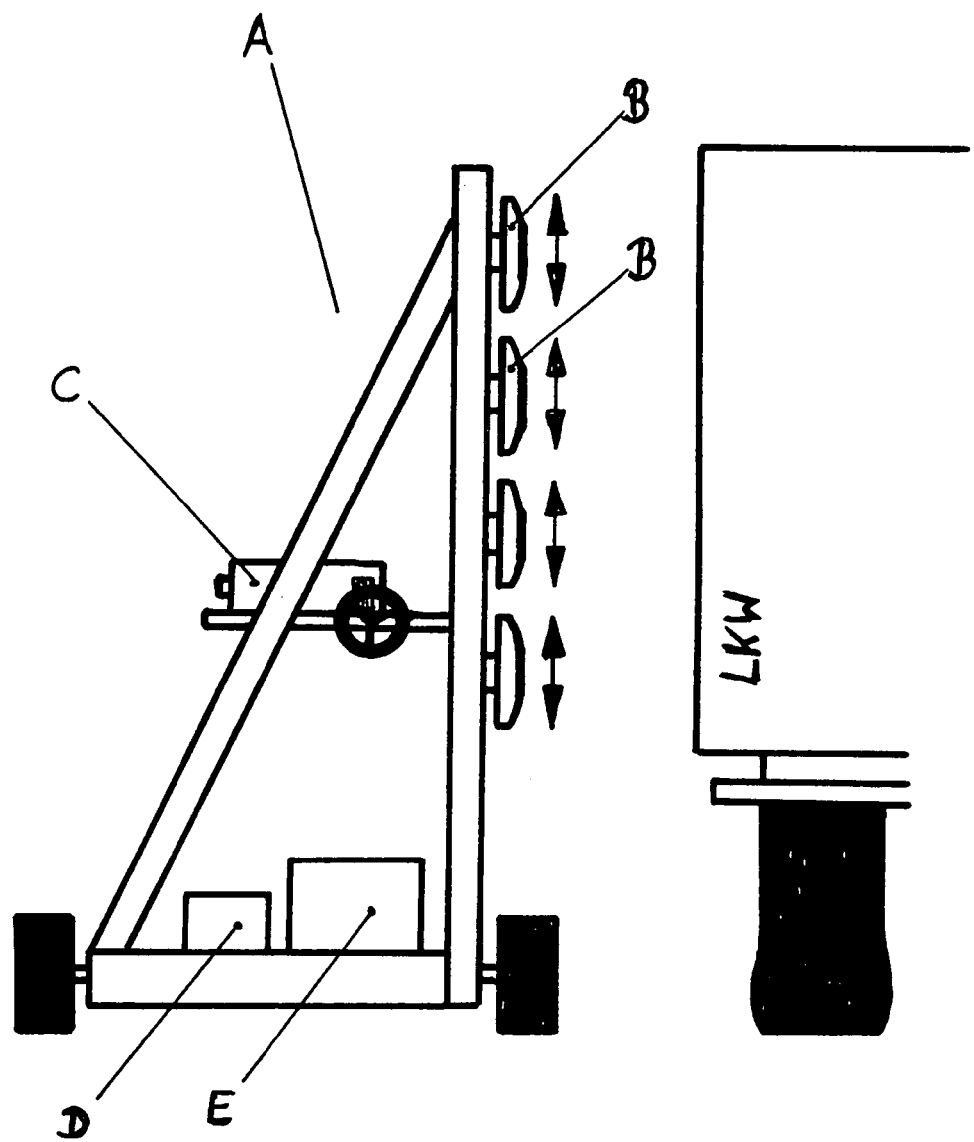
FIG. 6 shows a reading unit according to the invention.

FIG. 6 shows a reading unit according to the invention. The reading unit according to the invention is provided for the purpose of sensing a multiplicity of transportation and storage units, provided with an identification unit, which are arranged on a means of transport, particularly an HGV, and preferably on boards. The reading unit is preferably in the form of a spiry portal (A) which can be used to cover the height of the means of transport, said portal (A) being of mobile design and having at least one RFID reading and reception unit (B). The RFID reading and reception units (B) are designed so as to be vertically adjustable. In addition, a screen for showing the reading results and also a reader control unit (C) are provided. E denotes the power supply for the entire system, and D denotes the electric drive provided in this case. The portal can be adjusted manually or electrically to the HGV loading height. Advantageously, the portal is equipped with wheels and can be driven around the means of transport (HGV) in order to capture the identification data. This means that the data from an entire HGV load of transportation and storage units can be captured. A further advantage is that the logistical channels do not need to be equipped with static portals. The reading unit according to the invention also ensures that the data from complete HGV loads can be read in before closure and/or dispatch, which ensures that the current state is captured at the last possible time. In addition, the loads on arriving HGVs can be sensed before unloading starts.

The invention claimed is:

1. A transportation and storage unit, comprising:
   a periphery of the transportation and storage unit;
   a ring-shaped transponder identification unit surrounding said periphery of the transportation and storage unit for distinguishing and identifying goods or other articles, a multiplicity of the goods or other articles to be disposed, transported and/or stored and/or handled on pallets or transportation aids in groups or units or bundles;
   said ring-shaped transponder identification unit configured for mechanically spacing the transportation and storage units at intervals from one another for forming a radio gap from other transportation and storage units disposed on a pallet or a transportation aid; and
   a plurality of mutually spaced-apart transponders embedded in said transponder identification unit.

2. The transportation and storage unit according to claim 1, wherein said plurality of transponders are at least four transponders embedded in said transponder identification unit at intervals from one another and said transponders have identical identification data.

3. The transportation and storage unit according to claim 2, wherein said at least four transponders are five to six transponders.

4. The transportation and storage unit according to claim 1, wherein said transponder identification unit surrounds said periphery of the transportation and storage unit annularly.

5. The transportation and storage unit according to claim 1, wherein said transponder identification unit is disposed centrally and substantially horizontally relative to the transportation and storage unit.

6. The transportation and storage unit according to claim 1, which further comprises first and second rolling and/or centering rings, said transponder identification unit being disposed as a third ring between said rolling and centering rings.

7. The transportation and storage unit according to claim 1, which further comprises two rolling and centering rings, at least one of said rolling and centering rings being in the form of a transponder identification unit.

8. The transportation and storage unit according to claim 1, which further comprises a basic body of the transportation and storage unit, said transponders being protected from external mechanical influences by said transponder identification unit and being placed at intervals from said basic body.

9. The transportation and storage unit according to claim 1, which further comprises at least one of a shielding foil or a plate for said transponders providing protection from mechanical influences.

10. The transportation and storage unit according to claim 1, wherein said transponder identification unit is configured to receive frequencies in the UHF band.

11. The transportation and storage unit according to claim 1, wherein said transponders are active transponders.

\* \* \* \* \*